United States Patent [19]

Bremer

[11] Patent Number: 5,654,513

[45] Date of Patent: Aug. 5, 1997

[54] TURBINE FLOWMETER WITH SIMPLE HYDRODYNAMIC AXIAL THRUST COMPENSATION MEANS

[75] Inventor: Henning Bremer, Barsinghausen, Germany

[73] Assignee: H. Meinecke AG, Laatzen, Germany

[21] Appl. No.: 506,377

[22] Filed: Jul. 24, 1995

[30] Foreign Application Priority Data

Feb. 6, 1995 [DE] Germany .................. 195 03 843.6

[51] Int. Cl.$^6$ .................................................. G01F 1/12
[52] U.S. Cl. ............................. 73/861.83; 73/861.91
[58] Field of Search .................... 73/861.81, 861.83, 73/861.89, 861.92, 861.91

[56] References Cited

U.S. PATENT DOCUMENTS

| | | | |
|---|---|---|---|
| 3,143,882 | 8/1964 | Brueckner | 73/861.92 |
| 3,238,776 | 3/1966 | Potter | 73/861.91 |
| 3,364,743 | 1/1968 | Clinton | 73/861.83 |
| 3,518,881 | 7/1970 | Erickson | 73/861.83 |
| 3,756,079 | 9/1973 | November | 73/861.91 |
| 3,811,323 | 5/1974 | Swenson | 73/861.83 |
| 3,999,432 | 12/1976 | Coninx et al. | 73/861.91 |
| 4,186,603 | 2/1980 | Du Bae | 73/861.81 |
| 4,294,123 | 10/1981 | Amemori et al. | 73/861.92 |
| 4,449,410 | 5/1984 | Lett | 73/861.91 |
| 5,277,071 | 1/1994 | Pieper | 73/861.83 |

FOREIGN PATENT DOCUMENTS

| | | |
|---|---|---|
| 0076189 | 6/1983 | European Pat. Off. . |
| 1623946 | 2/1966 | Germany . |
| 4105840 | 1/1994 | Germany . |
| 1-105118 | 4/1989 | Japan ............... 73/861.89 |
| 1597560 | 10/1990 | U.S.S.R. ............. 73/861.89 |
| 1008508 | 10/1965 | United Kingdom ........ 73/861.91 |

*Primary Examiner*—Richard Chilcot
*Assistant Examiner*—Paul D. Amrozowicz
*Attorney, Agent, or Firm*—Michael J. Striker

[57] ABSTRACT

The turbine flowmeter includes an axially movable rotatable impeller wheel (1) consisting of an impeller hub (3) and vanes (4) connected to it; a first fixed hub (5) on one side of the impeller wheel; a second fixed hub (6) on another side of the impeller wheel opposite from the side on which the first fixed hub (6) is located; bearing means (b) for rotatably mounting the impeller wheel (1) between the first fixed hub (5) and the second fixed hub (6) so that the impeller wheel (1) is axially movable; a first fluid coupling device including facing portions of the impeller hub (3) and the first fixed hub (5) and a second fluid coupling device including facing portions of the impeller hub (3) and of the second fixed hub (6). The facing portions of the impeller hub providing driving portions of the coupling devices and the facing portions of the fixed hub providing counterwheel portions. When fluid flow is always in only one direction through the turbine flowmeter, the upstream fluid coupling device may be omitted. The fluid coupling devices act to oppose the hydrodynamic axial thrust causing wear on the downstream thrust bearing.

13 Claims, 2 Drawing Sheets

5,654,513

TURBINE FLOWMETER WITH SIMPLE HYDRODYNAMIC AXIAL THRUST COMPENSATION MEANS

BACKGROUND OF THE INVENTION

The present invention relates to a turbine flowmeter having an impeller wheel consisting of a hub with vanes attached whereby the wheel is rotatably mounted between a fixed hub located upstream of it and a fixed hub located downstream of it so that it can rotate and move in an axial direction.

Fluid flowing through a turbine flowmeter sets the impeller wheel in rotation. At the same time, the flowing of the liquid medium causes a hydrodynamic axial thrust to act on the impeller wheel in the direction of liquid flow and that thrust exerts a load on the thrust bearing on the downstream side of the impeller wheel, thereby causing wear which has a detrimental effect on the service life of this bearing.

To prevent or reduce this wear, the axial thrust acting on the impeller wheel is compensated for by providing the turbine flowmeter with mechanisms which place the wheel in an axial floating state. Examples of such mechanisms are known from EP 0 076 189 B1 and DE 41 05 840 A1. These and also other state-of-the-art mechanisms for relieving the axial thrust on the impeller wheel bearing(s) are relatively complicated in their construction.

SUMMARY OF THE INVENTION

Accordingly, it is an object of the present invention to provide a turbine flowmeter which has simpler means for compensating hydrodynamic axial thrust.

According to one aspect of the invention, this object is attained by a turbine flowmeter of the above-described type comprising a first fluid coupling device between facing portions of a first fixed hub and the impeller hub and a second fluid coupling device between facing portions of a second fixed hub and the impeller hub and, the facing portions on opposite sides of the impeller hub providing driving portions for the coupling devices and the facing portions of the fixed hubs providing counterwheel portions.

In one embodiment of the invention, the respective facing portions of the fixed hubs and the impeller hub have a plurality of uniformly circumferentially distributed chambers separated from each other by radial transverse ribs. The chambers on facing portions of the impeller hub and the fixed hubs face each other and open toward each other. The second downstream fluid coupling device includes the chambers on the facing sides of the impeller hub and the second fixed hub which open toward each other. A part of the fluid to measured moves in a circular motion in the second downstream fluid coupling device as an operating fluid. Forces are thereby generated which push the impeller wheel in the opposite direction to the incoming flow. In an identical way, the first upstream fluid coupling device is formed on the side situated upstream of the impeller hub by the chambers open to each other on the facing sides of the impeller hub and the first fixed hub. The forces which are generated here push the impeller wheel away from the upstream fixed hub in the direction of the incoming flow.

The fluid coupling devices can be opened or closed, i.e. activated or deactivated, by axial movement of the impeller wheel. When one fluid coupling device opens and its forces thereby reduced, the other fluid coupling device closes and increases its forces.

The hydrodynamic axial thrust generated by the flow is superimposed on this regulating function. The impeller wheel remains in the axial floating condition if the axial thrust, supplemented by the axial force from the first fluid coupling device, is balanced by the axial opposed force from the second fluid coupling device.

In the case of reverse flows, the functions of the fluid coupling devices are exchanged and compensate the axial thrust in an identical way.

In preferred embodiments Of the invention the chambers in the impeller hub have longitudinal cross-sections shaped like circular sectors and extend approximately from an outer periphery of the impeller hub to the shaft. The chambers in the fixed hubs advantageously can have longitudinal cross-sections shaped like circular sectors and extend approximately from an outer periphery of the fixed hubs to the shaft of the impeller wheel.

In other embodiments the chambers in the impeller wheel have longitudinal cross-sections shaped like circular sectors in an axially-extending outer peripheral projecting portion of the impeller hub. The chambers in the impeller wheel can have longitudinal cross-sections shaped like circular sectors in the outer peripheral portion of the fixed hubs.

In another practical embodiment of the turbine flowmeter, flat surfaces can replace chambers symmetrically positioned relative to the rotation axis of the impeller wheel in the upstream and/or downstream fixed hubs. This makes it possible to match the forces resulting from the fluid coupling devices to the axial thrust generated by the fluid flow acting on the impeller wheel. Chambers can be omitted in both upstream and downstream fluid coupling devices. This concept may be pursued to the extent that all the chambers on the fixed hubs are completely omitted, meaning that these sides of the fixed hubs are completely flat.

For cases in which turbine flowmeters operate exclusively with forward or one directional flows, only one fluid coupling device needs to be provided on the downstream side of the impeller wheel.

The invention is explained in more detail in the following by means of two embodiment examples.

BRIEF DESCRIPTION OF THE DRAWING

The objects, features and advantages of the present invention will now be illustrated in more detail by the following detailed description, reference being made to the accompanying drawing in which.

DESCRIPTION OF THE PREFERRED EMBODIMENTS

Figure 1:
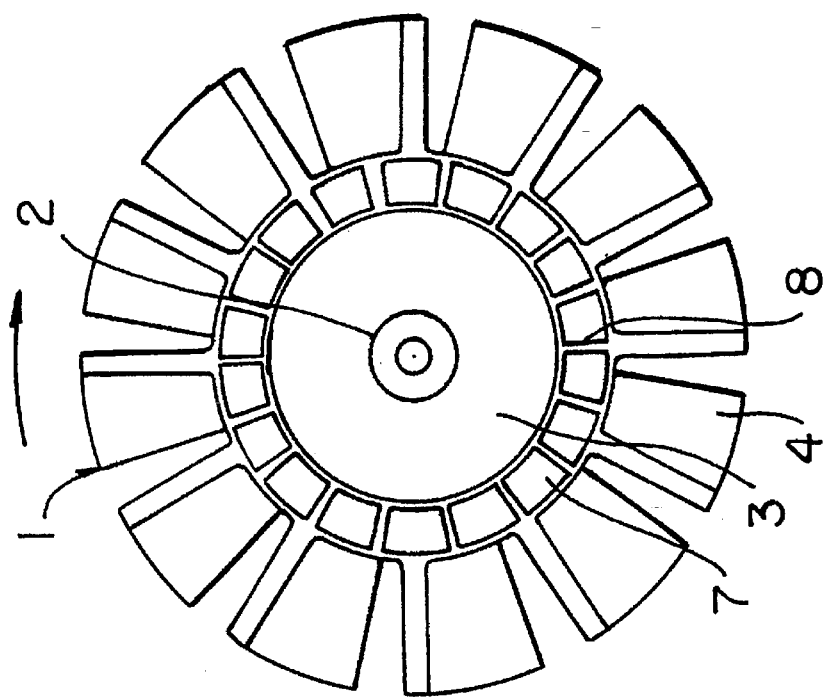
FIG. 1 is a schematic longitudinal cross-sectional view through a turbine flowmeter according to a first embodiment of the invention.

The rotatable impeller wheel 1 shown in the drawing in both embodiment examples is constructed in one piece, i.e. is a one-piece part, and consists of the shaft 2, the impeller hub 3 and the vanes 4 extending radially from the impeller hub 3. It is mounted between an upstream fixed hub 5 upstream of the impeller hub and a downstream fixed hub 6 downstream of impeller hub so that it can rotate about a rotation axis R and move in an axial direction. Conventional thrust bearings b are provided in the fixed hubs 5, 6 for this purpose.

Figure 2:
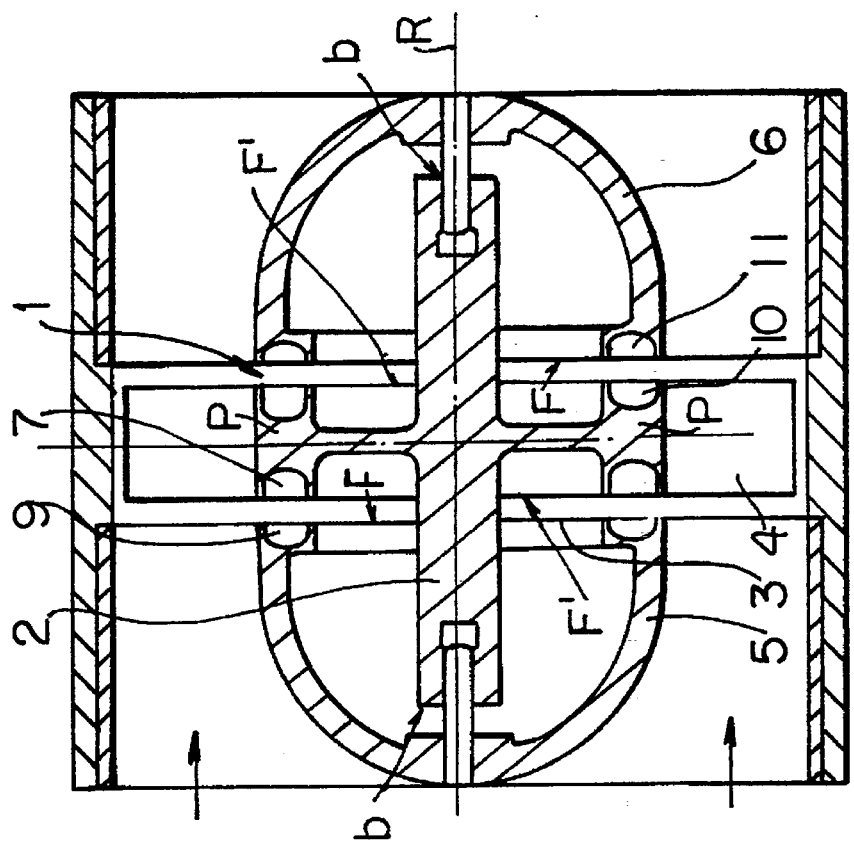
FIG. 2 is a plan view of the impeller wheel of the first embodiment in the direction of the incoming flow.

In the first embodiment shown in FIGS. 1 and 2, the impeller hub 3, starting at the shaft 2, is first disk-shaped and then continues in the direction of its periphery in a crown-type outer peripheral axially-extending projection P, to which the vanes 4 are attached, in the vicinity of the outer periphery of the fixed hubs 5, 6. Chambers 7 of equal longitudinal and transverse cross-section are incorporated in the front side of the outer peripheral axially-extending projection P of impeller hub 3 which open in the upstream direction and are uniformly distributed around its circumference. The chambers 7, which are open towards the upstream fixed hub 5, are separated from each other by radial ribs 8 and have longitudinal cross-sections shaped like circular sectors.

Chambers 9, distributed around the periphery of upstream fixed hub 5 and also separated from each other by radial ribs 8, can be positioned opposite the chambers 7 (by rotating the impeller) and are open on the side facing the impeller 1 and the chambers 7. The transverse cross-section of the opening of each of the chambers 9 corresponds to that of each of the chambers 7 as can be seen in FIG. 2. An upstream fluid coupling device is formed by a facing portion F' of the impeller hub 3 and facing portion F of the upstream fixed hub 5 which includes the opposing chambers 7,9.

Chambers 10 and 11 are provided on the downstream side of the impeller wheel i and in the downstream fixed hub 6 respectively. The chambers 10 and 11 are constructed like the chambers 7 and 9 respectively. A downstream fluid coupling device is formed by the facing portion F' of the impeller hub 3 and facing portion F of the downstream fixed hub 6 including chambers 10 and 11 respectively.

Figure 4:
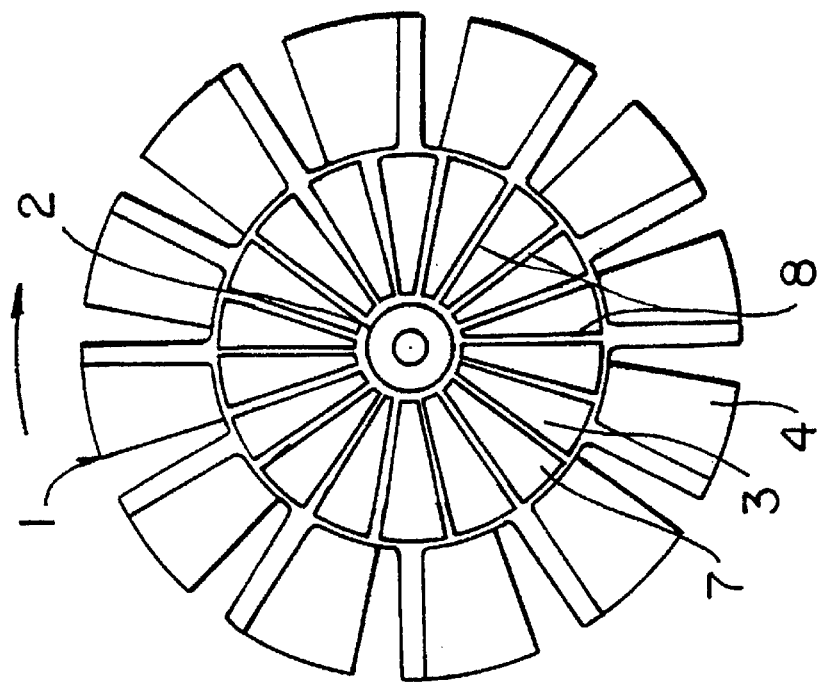
FIG. 4 is a plan view of the impeller wheel of the second embodiment in the direction of the incoming flow.
Figure 3:
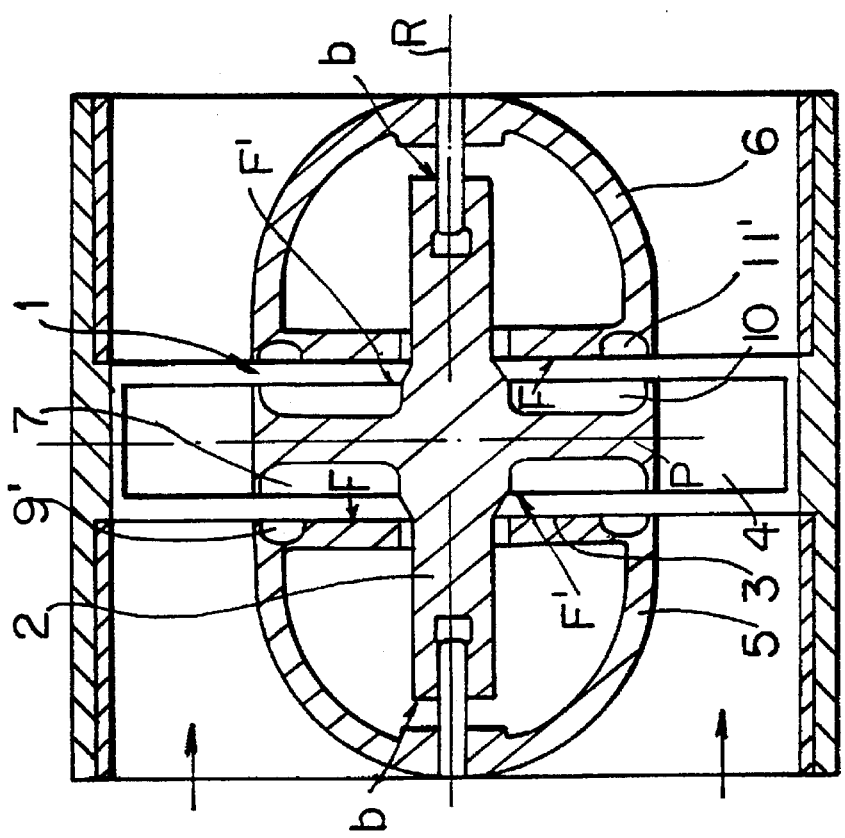
FIG. 3 is a schematic longitudinal cross-sectional view through a turbine flowmeter according to a second embodiment of the invention.

One of the ways in which the turbine flowmeter illustrated in FIGS. 3 and 4 differs from the first embodiment of FIGS. 1 and 2 is that the chambers 7, 10 in the impeller wheel hub 3 are elongated in the direction of the shaft 2 of the impeller wheel 1 and, therefore, are shaped the like sectors of a circle in cross-section.

Furthermore, the sides of the fixed hubs 5, 6 opposite or facing the respective chambers 7, 10 are flat, i.e. the chambers in fixed hubs 5,6 are completely omitted here. In this embodiment as well, the interaction of the chambers 7, 10 and the flat surfaces 9', 11' of the fixed hubs 5,6 forms fluid coupling devices and the thrust on the impeller wheel 1 is relieved as desired. In other respects this second embodiment is the same as the first embodiment and equivalent parts of the second embodiment are given the same reference number as in the first embodiment.

In the embodiments shown in the drawing the second fixed hub referred to in the claims below is the downstream hub 6 and the first fixed hub is the upstream hub 5. Also the second fluid coupling device is the downstream coupling device and the first fluid coupling device is the upstream coupling device in the embodiments shown in the drawing.

While the invention has been illustrated and embodied in a turbine flowmeter, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A turbine flowmeter comprising an axially movable rotatable impeller wheel (1) rotatable about a rotation axis (R), said impeller wheel consisting of an impeller hub (3) mounted on a shaft (2) and a plurality of vanes (4) connected to the impeller hub (3); a second fixed hub (6) on one side of the impeller wheel; a first fixed hub (5) on another side of the impeller wheel opposite from said side on which the second fixed hub (6) is located; bearing means (b) for rotatably mounting said impeller wheel (1) between the first fixed hub (5) and the second fixed hub (6) so that said impeller wheel (1) is axially movable and rotatable about the rotation axis (R); a second fluid coupling device including facing portions (F',F) of the impeller hub (3) and of the second fixed hub (6) and a first fluid coupling device including facing portions (F,F) of the impeller hub (3) and the first .fixed hub (5), said facing portions (F') of said impeller hub (3), providing driving portions of said fluid coupling devices and said facing portions (F) of said fixed hubs providing counterwheel portions.

2. A turbine flowmeter comprising an axially movable rotatable impeller (1), said impeller consisting of an impeller hub (3) and a plurality of vanes (4) connected to the impeller hub (3); a first fixed hub (5) on one side of the impeller; a second fixed hub (6) on another side of the impeller wheel opposite from said side on which the first fixed hub (5) is located; bearing means (b) for rotatably mounting said impeller (1) between the second fixed hub (6) and the first fixed hub (5) so that said impeller (1) is axially movable; and a fluid coupling device including facing portions (F,F') of the impeller hub (3) and the second fixed hub (6), said facing portion (F') of said impeller hub (3) providing a driving portion of said fluid coupling device and said facing portion (F) of said second fixed hub (6) providing a counterwheel portion, wherein said first fixed hub (5) is upstream of said impeller wheel (1) and said second fixed hub (6) is downstream of said impeller wheel (1) and said fluid coupling device is on a downstream side of said impeller wheel (1).

3. A turbine flowmeter comprising an axially movable rotatable impeller wheel (1) rotatable about a rotation axis (R), said impeller wheel consisting of an impeller hub (3) mounted on a shaft (2) and a plurality of vanes (4) connected to the impeller hub (3); a second fixed hub (6) on one side of the impeller wheel; a first fixed hub (5) on another side of the impeller wheel opposite from said side on which the second fixed hub (6) is located; bearing means (b) for rotatably mounting said impeller wheel (1) between the first fixed hub (5) and the second fixed hub (6) so that said impeller wheel (1) is axially movable and rotatable about the rotation axis (R); a second fluid coupling device including facing portions (F',F) of the impeller hub (3) and of the second fixed hub (6) and a first fluid coupling device including facing portions (F,F) of the impeller hub (3) and the first fixed hub (5), said facing portions (F') of said impeller hub (3) providing driving portions of said fluid coupling devices and said facing portions (F) of said fixed hubs providing counterwheel portions, wherein the facing portion (F) of the first fixed hub (5) and the facing portion (F') of the impeller hub (3) are provided with uniformly circumferentially distributed chambers (9) and chambers (7) respectively separated from each other by radial transverse ribs (8) and said chambers (9) in said first fixed hub (5) and said chambers (7) in said impeller hub (3) open toward each other and the facing portion (F) of the second fixed hub (6) and the facing portion (F') of the impeller hub (3)

are provided with uniformly circumferentially distributed chambers (11) and chambers (10) respectively separated from each other by radial transverse ribs (8) and said chambers (11) in said second fixed hub (5) and said chambers (10) in said impeller hub (3) open toward each other; and the first fluid coupling device includes the chambers (7) and the chambers (9) respectively in the facing sides of the impeller hub (3) and the second fixed hub (6) and the second fluid coupling device includes the chambers (10) and the chambers (11) respectively in the facing sides of the impeller hub (3) and the second fixed hub (6).

4. The turbine flowmeter as defined in claim 3, wherein said chambers (7, 10) in the impeller wheel (1) have longitudinal cross-sections shaped like circular sectors and extend approximately from an outer periphery of said impeller hub (3) to said shaft (2).

5. The turbine flowmeter as defined in claim 4, wherein said chambers (9, 11) in the fixed hubs (5,6) have longitudinal cross-sections shaped like circular sectors and extend approximately from an outer periphery of the fixed hubs (5,6) to said shaft (2) of the impeller wheel (1).

6. The turbine flowmeter as defined in claim 3, wherein said chambers (7, 10) in the impeller wheel (1) have longitudinal cross-sections shaped like circular sectors in an outer peripheral axially extending projecting portion (P) of the impeller hub (3).

7. The turbine flowmeter as defined in claim 6, wherein said chambers (9, 11) in the impeller wheel (1) have longitudinal cross-sections shaped like circular sectors in an outer peripheral axially extending projecting portion (P) of the fixed hubs (5,6).

8. The turbine flowmeter as defined in claim 3, wherein more of said chambers are provided in the second fluid coupling device than in the first fluid coupling device.

9. A turbine flowmeter comprising an axially movable rotatable impeller wheel (1) rotatable about a rotation axis (R), said impeller wheel consisting of an impeller hub (3) mounted on a shaft (2) and a plurality of vanes (4) connected to the impeller hub (3); a first fixed hub (6) on one side of the impeller wheel; a second fixed hub (5) on another side of the impeller wheel opposite from said side on which the first fixed hub (6) is located; bearing means (b) for rotatably mounting said impeller wheel (1) between the second fixed hub (5) and the first fixed hub (6) so that said impeller wheel (1) is axially movable and rotatable about the rotation axis (R); a second fluid coupling device including facing portions (F',F) of the impeller hub (3) and of the second fixed hub (6) and a first fluid coupling device including facing portions (F',F) of the impeller hub (3) and the first fixed hub (5), said facing portions (F') of said impeller hub (3) providing driving portions of said fluid coupling devices and said facing portions (F) of said fixed hubs providing counterwheel portions, wherein respective opposite sides of the impeller hub (3) are provided with uniformly circumferentially distributed chambers (7) and uniformly circumferentially distributed chambers (10) separated from each other by radial transverse ribs (8) and a side of said first fixed hub (5) facing said impeller wheel (1) has symmetrically distributed flat surfaces (9') opposite a portion of said chambers (7) of the impeller hub (3) distributed symmetrically relative to the rotation axis (R) of the impeller wheel and symmetrically distributed chambers (9) opposite a remaining portion of said chambers (7); and a side of said second fixed hub (6) facing the impeller wheel (1) has symmetrically distributed flat surfaces (11') opposite a portion of said chambers (10) of said impeller hub (3) distributed symmetrically relative to the rotation axis (R) and symmetrically distributed chambers (11) opposite a remaining portion of said chambers (10); and the first fluid coupling device includes the chambers (7) in the impeller hub (3), the flat surfaces (9') and the chambers (9) in the first fixed hub (5) and the second coupling device includes the chambers (10) in the impeller hub (3), the flat surfaces (11') and the chambers (11) in the second fixed hub (6).

10. The turbine flowmeter as defined in claim 9, wherein said chambers (7, 10) in the impeller (3) have longitudinal cross-sections shaped like circular sectors and extend approximately from an outer periphery of said impeller hub (3) to said shaft (2).

11. A turbine flowmeter comprising an axially movable rotatable impeller wheel (1) rotatable about a rotation axis (R), said impeller wheel consisting of an impeller hub (3) mounted on a shaft (2) and a plurality of vanes (4) connected to the impeller hub (3); a first fixed hub (6) on one side of the impeller wheel; a second fixed hub (5) on another side of the impeller wheel opposite from said side on which the first fixed hub (6) is located; bearing means (b) for rotatably mounting said impeller wheel (1) between the second fixed hub (5) and the first fixed hub (6) so that said impeller wheel (1) is axially movable and rotatable about the rotation axis (R); a second fluid coupling device including facing portions (F',F) of the impeller hub (3) and of the second fixed hub (6) and a first fluid coupling device including facing portions (F',F) of the impeller hub (3) and the first fixed hub (5), said facing portions (F') of said impeller hub (3) providing driving portions of said fluid coupling devices and said facing portions (F) of said fixed hubs providing counterwheel portions, wherein the opposite sides of the impeller hub (3) are provided with uniformly circumferentially distributed chambers (7, 10) separated from each other by radial transverse ribs (8) and a side of said first fixed hub (5) facing said impeller has a flat surface (9') opposite said chambers (7) of the impeller hub (3); and a side of said second hub (6) facing the impeller (1) has a flat surface (11') opposite said chambers (10) of said impeller hub (3); and the first fluid coupling device includes the chambers (7) in the impeller hub (3) and the flat surface (9') on the first fixed hub (5) and the second fluid coupling device includes the chambers (10) in the impeller hub (3) and the flat surface (11') on the second fixed hub (6).

12. A turbine flowmeter comprising an axially movable rotatable impeller (1), said impeller consisting of an impeller hub (3) and a plurality of vanes (4) connected to the impeller hub (3); a first fixed hub (5) on one side of the impeller; a second fixed hub (6) on another side of the impeller wheel opposite from said side on which the first fixed hub (5) is located; bearing means (b) for rotatably mounting said impeller (1) between the second fixed hub (6) and the first fixed hub (5) so that said impeller (1) is axially movable; and a fluid coupling device including facing portions (F,F') of the impeller hub (3) and the second fixed hub (6), said facing portion (F') of said impeller hub (3) providing a driving portion of said fluid coupling device and said facing portion (F) of said second fixed hub (6) providing a counterwheel portion, wherein said first fixed hub (5) is upstream of said impeller wheel (1) and said second fixed hub (6) is downstream of said impeller wheel (1) and said fluid coupling device is on a downstream side of said impeller wheel (1), and wherein the facing portions of the second fixed hub (6) and the impeller hub (3) are provided with uniformly circumferentially distributed chambers (11) and chambers (10) respectively separated from each other by radial transverse ribs (8) and said chambers (11) in said second fixed hub (6) and said chambers (10) in said impeller hub (3) open toward each other; and the fluid coupling device includes said chambers (11) in said second fixed hub (6) and said chambers (10) in said impeller hub (3).

13. A turbine flowmeter comprising an axially movable rotatable impeller (1), said impeller consisting of an impeller hub (3) and a plurality of vanes (4) connected to the impeller hub (3); a first fixed hub (5) on one side of the impeller; a second fixed hub (6) on another side of the impeller wheel opposite from said side on which the first fixed hub (5) is located; bearing means (b) for rotatably mounting said impeller (1) between the second fixed hub (6) and the first fixed hub (5) so that said impeller (1) is axially movable; and a fluid coupling device including facing portions (F,F') of the impeller hub (3) and the second fixed hub (6), said facing portion (F') of said impeller hub (3) providing a driving portion of said fluid coupling device and said facing portion (F) of said second fixed hub (6) providing a counterwheel portion, wherein said first fixed hub (5) is upstream of said impeller wheel (1) and said second fixed hub (6) is downstream of said impeller wheel (1) and said fluid coupling device is on a downstream side of said impeller wheel (1), and wherein the facing portion (F) of the second fixed hub (6) and the facing portion (F') of the impeller hub (3) are provided with a flat surface (11') and uniformly circumferentially distributed chambers (10) respectively, said chambers (10) being separated from each other by radial transverse ribs (8), and the fluid coupling device includes the chambers (10) in the impeller hub (3) and the flat surface (11') on the second fixed hub (6).

* * * * *